United States Patent [19]

Brock et al.

[11] 4,044,392
[45] Aug. 23, 1977

[54] PROCESS FOR MAKING A READ-WHILE-WRITE TAPE HEAD AND THE PRODUCT MADE THEREBY

[75] Inventors: George W. Brock; Frank B. Shelledy; Arthur B. Wills, all of Boulder, Colo.

[73] Assignee: International Business Machines Corporation, Armonk, N.Y.

[21] Appl. No.: 604,689

[22] Filed: Aug. 14, 1975

[51] Int. Cl.$^2$ .......................................... G11B 5/221
[52] U.S. Cl. .................................... 360/113; 29/603; 360/124; 360/129
[58] Field of Search ................. 29/603; 360/113, 123, 360/124, 125, 127, 129

[56] References Cited

U.S. PATENT DOCUMENTS

| | | | |
|---|---|---|---|
| 3,064,333 | 11/1962 | Kristiansen et al. | 29/603 |
| 3,737,992 | 6/1973 | Braun et al. | 29/603 |
| 3,821,815 | 6/1974 | Abbott et al. | 29/603 X |
| 3,829,896 | 8/1974 | Brock et al. | 29/603 X |
| 3,842,494 | 10/1974 | Chiba et al. | 29/603 |
| 3,854,199 | 12/1974 | Ridgway | 29/603 |
| 3,881,190 | 4/1975 | Brock et al. | 360/113 |
| 3,908,194 | 9/1975 | Romankiw | 29/603 X |

OTHER PUBLICATIONS

"Head Fabrication", *IBM Tech. Dis. Bulletin*, N. L. Robinson, vol. 15, No. 11 (Apr. 1973).

*Primary Examiner*—Carl E. Hall
*Attorney, Agent, or Firm*—Gunter A. Hauptman

[57] ABSTRACT

Write windings are deposited on a ferrite half yoke mounted on a titanium body, and magnetoresistive elements are deposited on another ferrite half yoke mounted on another titanium body. A center section comprising a sandwich of silver-copper shielding material between two ferrite sheets has glass-filled slots cut on one side thereof. The center shield is placed between the write and read sides with the write windings placed between pairs of glass-filled slots and with the magnetoresistive elements in contact with the opposite surface of the center shield. The write windings and the magnetoresistive elements are connected to connector blocks prior to final assembly, and the write and read sides and the center section are pressured together by bolts through two end pieces, forming a vise-like structure.

7 Claims, 4 Drawing Figures

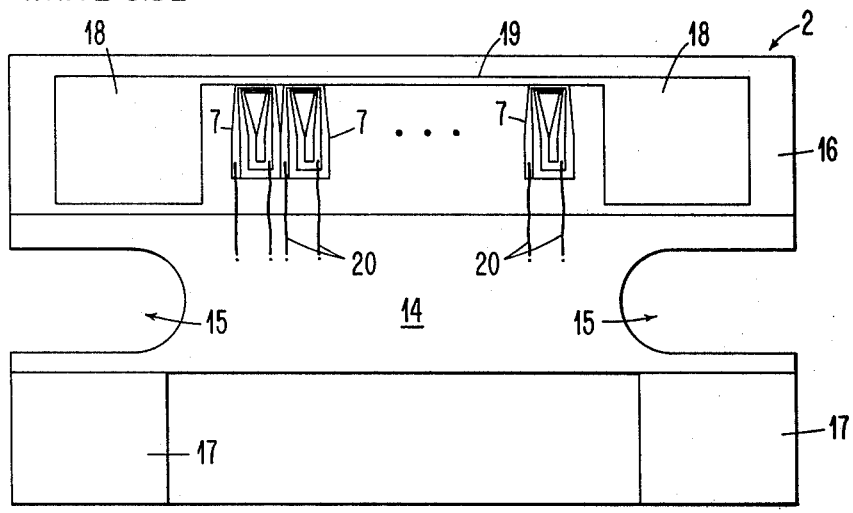
FIG. 2 WRITE SIDE
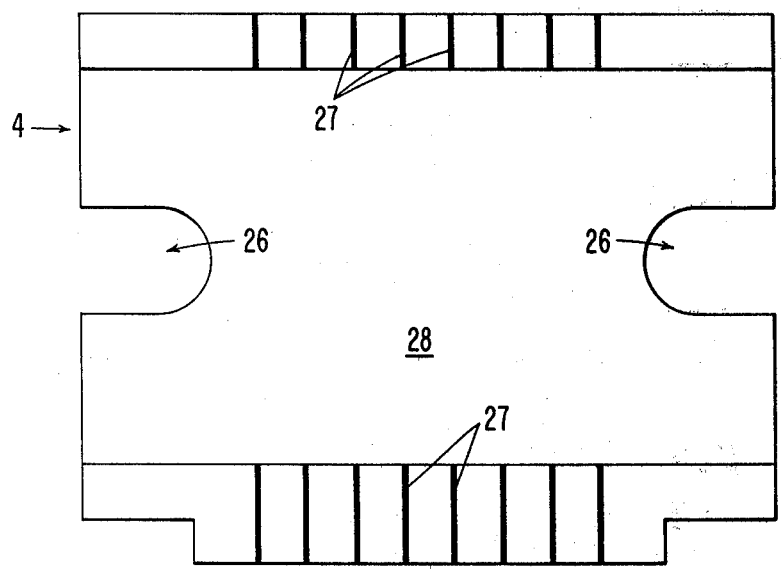
FIG. 3 CENTER SECTION
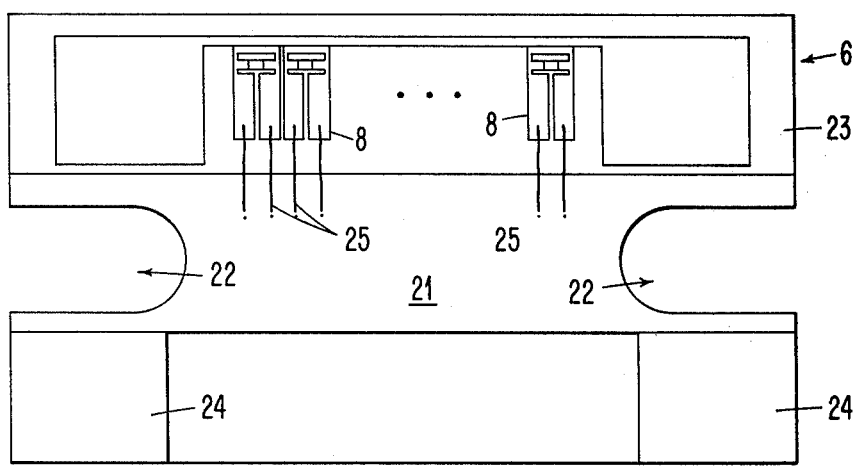
FIG. 4 READ SIDE

PROCESS FOR MAKING A READ-WHILE-WRITE TAPE HEAD AND THE PRODUCT MADE THEREBY

CROSS-REFERENCE TO RELATED APPLICATIONS

The following patent applications are incorporated herein by this reference for their disclosure:

U.S. Pat. No. 3,813,692, entitled "Internally Biased Magnetoresistive Magnetic Transducer", by G. W. Brock and F. B. Shelledy, issued May 28, 1974;

U.S. Pat. No. 3,821,815, entitled "Apparatus for Batch-Fabricating Magnetic Film Heads and Method Therefor", by C. D. Abbott, G. W. Brock, N. L. Robinson, F. B. Shelledy and S. H. Smith, issued June 28, 1974;

U.S. Pat. No. 3,881,190, entitled "Shielded Magnetoresistive Magnetic Tranducer and Method of Manufacture Thereof", by G. W. Brock, F. B. Shelledy, S. H. Smith and A. B. Wills, issued Apr. 29, 1975; commonly assigned to International Business Machines Corporation.

BACKGROUND OF THE INVENTION

1. Field of the Invention

This invention relates to a method for manufacturing magnetic heads having both magnetoresistive and inductive elements and to the products of the process.

2. Description of the Prior Art

The conventional technique for both reading and writing data recorded as magnetic manifestations on magnetic tape has been the inductive magnetic head. In such a head, a single inductive winding has been provided for each track on the head. Electrical current in a winding causes a magnetic field which records magnetic manifestations on the tape corresponding to the electrical current. During reading, the same winding detects recorded magnetic manifestations and translates them into corresponding electrical voltage. Simultaneous reading and writing normally requires two windings per track to prevent the current in the write winding from causing an undesirable voltage in the read winding. Recently, the magnetoresistive element has been recognized as an especially good read element capable of replacing an inductive winding. However, the magnetoresitive element is also sensitive to magnetic fields emanated by write inductive windings and must be shielded from inductive and capacitive coupling with the windings.

In an article entitled "Magnetoresistive Read/Write Head", by G. W. Brock, F. B. Shelledy and L. Viele, appearing in the IBM TECHNICAL DISCLOSURE BULLETIN, pages 1206-1207, September, 1972, there is described a read-while-write magnetic head comprising a magnetoresistive element and a conductive write inductor placed within the same gap formed by two ferrite poles. The cross-talk or feedthrough between the inductive winding and the magnetoresistive element is reduced in this configuration by pulse thing. Placing the magnetoresistive element between two conductors forming the inductive winding, as described in U.S. Pat. No. 3,887,945, entitled "Head Assembly for Recording and Reading, Employing Inductive and Magnetoresistive Elements", by D. A. Nepela et al, issued June 3, 1975, and assigned to International Business Machines Corporation, isolates the read and write elements from each other. The cross-talk may be reduced and the isolation between the inductive element and the magnetoresistive element increased by providing shields between the element, constructed of Permalloy, as described in patent application Ser. No. 498,504, entitled "Integrated Magnetoresistive Read, Inductive Write, Batch Fabricated Magnetic Head", by L. t. Romankiw, filed Aug. 19,1974, now U.S. Pat. No. 3,908,194 and assigned to International Business Machines Corporation. The use of a highly conductive material to reduce feedthrough from the write field to the read element is suggested in a paper presented by G. W. Brock and F. B. Shelledy, Apr. 15, 1975, at the 1975 INTERMAG Conference, London, England, entitled "BAtch-Fabricated Heads from a Functional Standpoint".

In addition to the need to reduce feedthrough of the write field to the read element, the last referenced article discusses the criteria necessary for a magnetic head to operate in the read-while-write mode. Such a magnetic head requires special manufacturing processes and materials characteristics in order to operate properly and, in fact, to be capable of construction at all. When the elements are placed onto a substrate by thin film deposition techniques prior to assembly into a magnetic head, the problems are multiplied. For example, it is necessary to lap the substrate material to a sufficiently high finish and flatness, in order to obtain optimum magnetoresistive properties in the element, and simultaneously form and contour the head materials to a correct and accurately determined air bearing surface. The surface must then be continuously and uniformly wear-resisting and free from thin, soft lines of material transverse to the tape path and from any pockets that can suffer from erosion and subsequent filling with debris. The contour surface must, further, be free from materials that cause adhesive wear of the tape surface and, hence, contaminate the contour. Insulation problems must be avoided during manufacture and operation. A low running temperature must be maintained in order to avoid head stability problems and contamination of the head surface by the media. In conventional methods of packaging such heads, the deposited elements are sandwiched between two hard materials, leaving an empty space between adjacent elements which is normally filled by epoxy-type cements. However, the epoxy line which appears on the contour of the magnetic head after contour formation is eroded by the media faster than the surrounding, usually metallic, material. This leads to contaminaton of the epoxy line by debris. Another problem that results from this approach is the presence of a portion of the element itself at the surface of the head during contouring. Since the element is usually a soft material such as copper while the rest of the head is some harder material, the finishing operation results in smearing of the soft metal, chipping of insulation layers and damage to the harder material because of contamination of the finishing machine cutting tools by the soft metals. Smearing can cause undesirable electrical shorts, and the mere presence of the copper in contact with another metal can cause corrosion by electrolysis.

SUMMARY OF THE INVENTION

In Applicants' process, the active read and write elements are deposited on ferrite half yokes attached to titanium or baria titania ceramic (BTC) bodies in such a way that no deleterious material will appear on the surface of the head following construction. The read and write elements are shielded from each other to prevent feedthrough of the write magnetic field to the read element by providing a center section which has sandwiched between the magnetic closures a highly conductive silver-copper alloy which, due to the contour design, is not present at the head-tape interface. The center section also enhances the write element operation by providing glass-filled slots on each side of each write element for defining the track edges. Titanium or BTC end pieces exert a vise action to sandwich the read and write side and center section together. The entire head is ground to contour by monitoring the resistance of the read elements during grinding until a predetermined resistance is reached.

The foregoing and other features and advantages of the invention will be apparent from the following more particular description of a preferred embodiment of the invention, as illustrated in the accompanying drawings.

IN THE DRAWINGS

FIG. 2 shows the write side element used in assembling the magnetic head of FIG. 1.

FIG. 3 shows the center section used in assembling the magnetic head of FIG. 1.

FIG. 4 shows the read side used in assembling the magnetic head of FIG. 1.

DESCRIPTION OF THE PREFERRED EMBODIMENT

Figure 1:
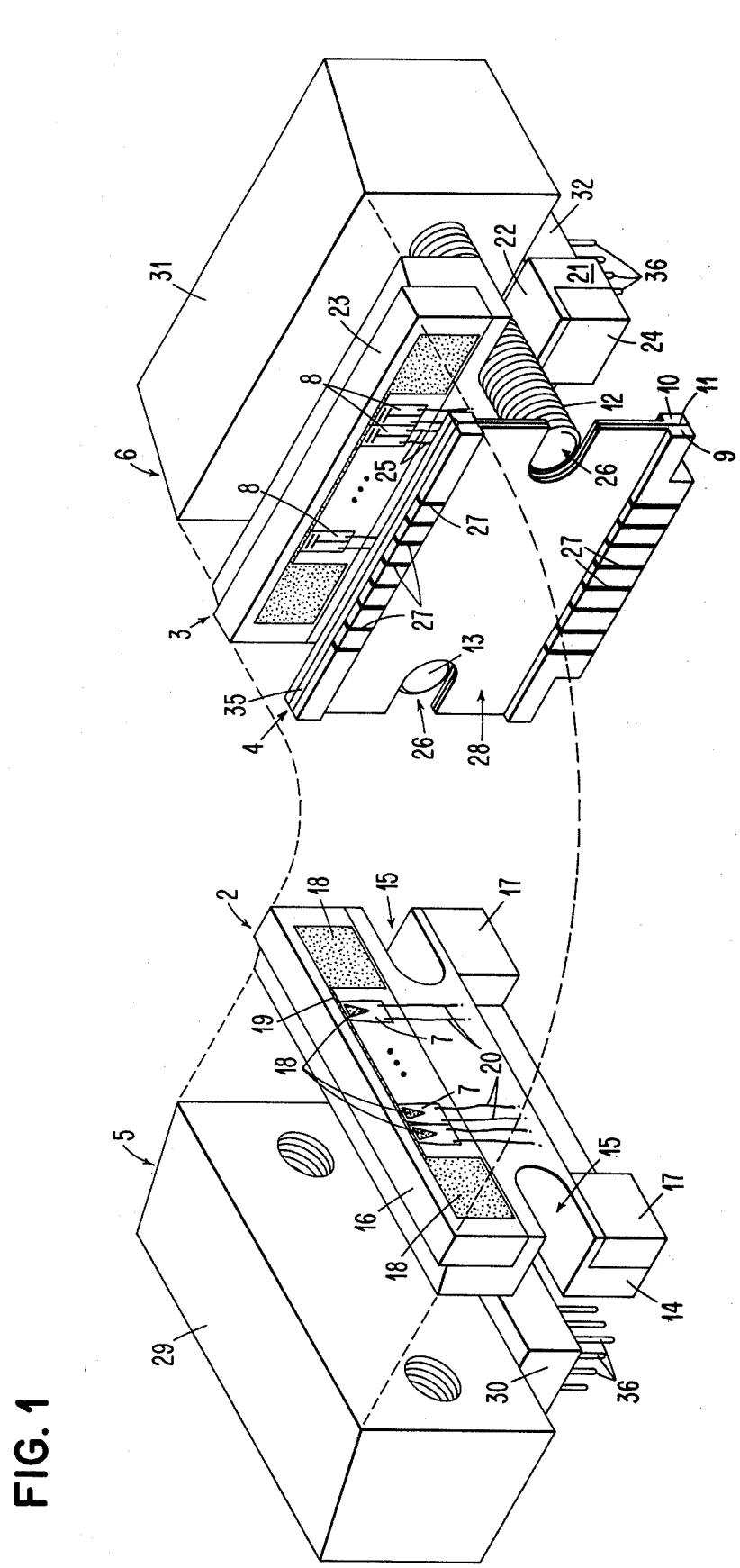
FIG. 1 shows a magnetic head as assembled by the process practiced in accordance with the invention.

Referring to FIG. 1, a write side 2 carries inductive write elements 7 and a read side 3 carries magnetoresistive elements 8. A center section 4, comprising two magnetic layers 9 and 10 and a highly conductive layer 11, is sandwiched between the write side 2 and the read side 3. The magnetic head structure is fastened together by a left end piece 5 and a right end piece 6 under pressure from bolts 12 and 13.

The write side 2 will now be described in more detail with reference to both FIGS. 1 and 2. A titanium or BTC body 14 having cut-aways 15 for the bolts 12 and 13 supports a magnetic (for example, ferrite) bar or half yoke 16 and two pads 17 of similar material. A thin titanium adhesion layer is formed on the top ferrite bar 16 and conductors (for example, copper) are then deposited thereon in a spiral form to form the write elements 7. Insulative (such as $Al_2O_3$) pads 18 are provided in the center of each winding and in larger areas on the extremities of the ferrite bar 16. An insulative (viz. Alhd $2O_3$) gap spacer 19 is also formed across the top of the ferrite bar 16. The gap spacer 19 is maintained slightly thicker than the conductors 7 providing a wear resisting gap by keeping the copper conductors 7 away from the top surface of the head 1 and also spacing the conductors 7 away from the center section 4. The deposited thickness of the gap spacer 19 accurately determines the write gap dimension. Two conductive, which may be copper, wires 20 are connected to each of the write elements 7. Titanium is suggested for the body 14 of the write side 2 because this material has a desirable coefficient of expansion compatible with other materials such as ferrite used in the construction of the head. BTC also has similar desirable characteristics.

Referring now to FIGS. 1 and 4, the read side 3 will be described. A body 21, constructed of a material chosen for the same reason as titanium was chosen for the body 14, has openings 22 for (titanium) bolts 12 and 13 and carries a ferrite bar 23 and pads 24. The pads 24 aid in lapping the read side 3 by providing a uniform wearing surface and a three-point support. Magnetoresistive elements 8 are deposited on the ferrite bar 23 in accordance with the cross-referenced U.S. Pat. No. 3,813,692, which describes a "shunt biased" magnetoresistive element constructed of contiguous layers of, preferably, titanium and Permalloy. Each magnetoresistive element 8 is connected to a pair of conductive wires 25.

Referring now to FIGS. 1 and 3, the center section 4 will be described. The center section 4 includes a pair of apertures 26 for passing the bolts 12 and 13 and is constructed of a sandwich of high permeability material 9 and 10 and highly conductive material 11. The high permeability material may be ferrite metallized with a chromium alloy and the highly conductive material may be a silver alloy such as the commercially available brazing solder known as NICUSIL 3 or the like. Glass-filled slots 27 are cut on the side of the center section 4 which faces the write side 2 when the magnetic head is assembled. These slots limit fringe flux from the write elements and hence sharply define the write tracks. An additional glass slots 35 intersecting slot 27 prevents cross-talk between tracks by isolating the closures for each write element from each other and from the body of the center section. The center section 4 also has undercuts 28 providing space for the wires 20 and 25 connected to the write windings 7 and the magnetoresistive elements 8.

Still referring to FIG. 1, the left end piece 5 and the right end piece 6 combine titanium blocks 29 and 31 and write connector block 30 and read connector block 32, each carrying connector pins 36. The wires from the write windings 7 are connected to the write connector block 30 pins 36, and the wires 25 from the magnetoresistive elements 8 are connected to the read connector block 32 pins 36.

It will be understood by those skilled in the art that BTC may be substituted for the titanium, and further that alternate clamping or fastening methods may be used. Also, if desired, the write elements 18 and read elements 8 may be deposited on opposite sides of the center section 28 instead of on the read section 21 and write section 14.

DESCRIPTION OF METHOD OF MANUFACTURE

The method of assembling the magnetic head 1 will now be described.

1. The ferrite bars and pads 16, 17, 23 and 24 are brazed onto the titanium bodies 14 and 21.

2. Write elements 7 and read elements 8 are then deposited upon their respective ferrite substrates 14 and 23.

3. Conductors 20 and 25 are connected to the write windings 7 and the magnetoresistive elements 8 and to the conductors 30 and 32.

4. The write side 2 and read side 3 are then brought into contact with a center section 4 which has been assembled by: (a) forming the glass line 35 with high temperature melting point glass; (b) brazing a highly conductive layer 11 between magnetic layers 9 and 10; (c) cutting the slot 27; (d) filling the slots 27 with glass of a lower temperature melting point than used for line 35; and (e) polishing.

5. The conductors 20 and 25 are connected to the write connector block 30 and the read connector block 32 pins 36, respectively.

6. The write side 2, center section 4 and read side 3 are assembled accurately with respect to each other to insure alignment of the write elements 18 with respect to the read elements 8 and to give uniform relative throat heights. The assembly is then squeezed between the left end piece 5 and the right end piece 6 by placing bolts 12 and 13 therethrough and tightening them.

7. The resulting structure is filled by capillary action with a low viscosity (epoxy) cement applied to the gaps to seal and stabilize the structure. (This gives good expansion characteristics for the entire structure and prevents both gap slippage and ferrite fracture.)

8. The structure is heated to cure the epoxy. (The expansion uniformity of the heated materials is critical here in order to prevent slipped gaps and cracking of the ferrite while held at an elevated temperature.)

9. A head contour grinding technique then proceeds in the manner described in U.S. Pat. No. 3,821,815 to form a surface contour which includes a scallop in the center section 4 which recesses the highly conductive layer 11 below the level of the surface contour. (This grinding process involves watching the resistance of the magnetoresitive elements 8 in order to determine the depth of the final head contour line and the gap length. Head contour formation is complete when the desired element resistance has been reached for both the write windings 7 and for the monitored magnetoresistive elements 8.)

While the invention has been particularly shown and described with reference to a preferred embodiment thereof, it will be understood by those skilled in the art that various changes in form and details may be made therein without departing from the spirit and scope of the invention.

What is claimed is:

1. A method for manufacturing a multitrack read-while magnetic head comprising the steps of:
   bonding substrates of ferrite on two titanium bodies;
   depositing on one ferrite substrate a single copper write winding for each track;
   depositiong on the other ferrite substrate a single magnetoresistive read element for each track;
   connecting each of the write windings and read elements to a separate write connector block and a read connector block via a pair of wires;
   brazing a silver-copper sheet between a pair of ferrite layers, one of which contains glass-filled slots, thereby forming a center section which resists feedthrough, and forming a yoke which provides a magnetic closure;
   assembling the sheet between the two substrates such that the ferrite layers of the center suction cooperate with respective ones of the ferrite substrates to form a magnetic head.
   applying low viscosity epoxy from the outside of the bodies;
   squeezing the bodies together between two titanium end pieces fastened by titanium bolts; and
   forming a surface contour on the head by grinding and lapping the ferrite substrates and center section while simultaneously monitoring the resistance of the read elements.

2. The method of claim 1 wherein the forming operation includes removing at least one transverse scallop from the center section.

3. A method for manufacturing from two bodies a multitrack read-while-write magnetic head comprising the steps of:
   bonding a substrate of magnetically permeable material on each of said two bodies;
   depositing on one substrate a single conductive write winding for each track;
   depositing on the other substrate a single read element, having an electrical resistance, for each track;
   connecting the write windings and read elements to outputs;
   braxing a highly conductive sheet between a pair of magnetically permeable layers, thereby forming a center section which resists feedthrough and a yoke which provides a magnetic closure;
   assembling the center section between the two substrates such that the magnetically permeable layers of the center section cooperate with respective ones of the magnetically permeable substrates to form a magnetic head.
   applying a sealant to the outside surfaces of the assembly;
   squeezing the assembly together between end pieces; and
   forming a surface contour on the head by abrading the substrates and center section while simultaneously monitoring the resistances of the read elements.

4. The process of forming a device for transducing electrical signals and magnetic fields, including the steps of:
   depositing a field generating write winding on a first composite titanium-ferrite substrate;
   depositing a field sensitive read element, having an electrical resistance, on a second composite titanium-ferrite substrate;
   providing connections between the write winding and read element and external electrical circuits;
   assembling a highly conductive feedthrough-eliminating sheet between two magnetically permeable layers, one of which includes glass-filled slots;
   assembling the feedthrough-eliminating assembly between the first and second substrates such that the magnetically permeable layers of the feedthrough-eliminating assembly cooperate with respective ones of the titanium-ferrite substrates to form a transducing device; and
   abrading the surface of the assembled structure while monitoring the resistance of the read element.

5. The product made by the process of:
   depositing a magnetic field writing winding on a first composite titanium-ferrite substrate;
   connecting the winding to an external source of electrical signals;
   depositing a magnetic field reading element, having an electrical resistance, on a second composite titanium-ferrite substrate;
   connecting the element to an external electrical signal utilization circuit;
   assembling a highly conductive feedthrough-eliminating sheet between two magnetically permeable layers;
   forming grooves in a selected one of the two permeable layers;
   filling the grooves with glass;
   enclosing the feedthrough-eliminating assembly between the first and second substrates such that the magnetically permeable layers of the feedthrough-eliminating assembly cooperate with respective ones of the titanium-ferrite substrates to form a magnetic head;

squeezing the structure together between two titanium vise blocks with titanium bolts;
abrading the surface of the assembled structure;
monitoring the resistance of the read element; and
terminating surface abrasion when the resistance equals a predetermined quantity.

6. The product made by the process of: bonding a first ferrite substrate on a first titanium body;
bonding a second ferrite substrate on a second titanium body;
depositing on the first substrate a single copper write winding for each track;
depositing on the second substrate a single magnetoresistive read element for each track;
connecting each of the write windings and read elements to a pair of wires;
brazing a silver-copper sheet between a pair of ferrite layers, one of which layers has glass-filled slots, thereby forming a center section and such that the ferrite layers of the center section cooperate with respective ones of the ferrite substrates to form a magnetic head 7. The product of claim 6 wherein the process includes the further steps of:
forming a surface contour on the head by abrading the assembly while simultaneously monitoring the resistance of the read elements; and
removing at least one transverse scallop from the center section.

* * * * *

UNITED STATES PATENT AND TRADEMARK OFFICE
CERTIFICATE OF CORRECTION

PATENT NO. : 4,044,392

DATED : August 23, 1977

INVENTOR(S) : G. W. Brock et al

It is certified that error appears in the above-identified patent and that said Letters Patent are hereby corrected as shown below:

Column 5, line 52, "suction" should read --section--.

Column 6, line 9, "braxing" should read --brazing--.

Column 8, line 5, after "section" insert --;-- and after "and" begin new paragraph and insert --assembling the above bodies together between end pieces--.

Column 8, line 8, after "head" insert --.--.

Signed and Sealed this

Third Day of January 1978

[SEAL]

Attest:

RUTH C. MASON
Attesting Officer

LUTRELLE F. PARKER
Acting Commissioner of Patents and Trademarks